S. MELLON.
Vibrating Churn.
No. 208,751.  Patented Oct. 8, 1878.
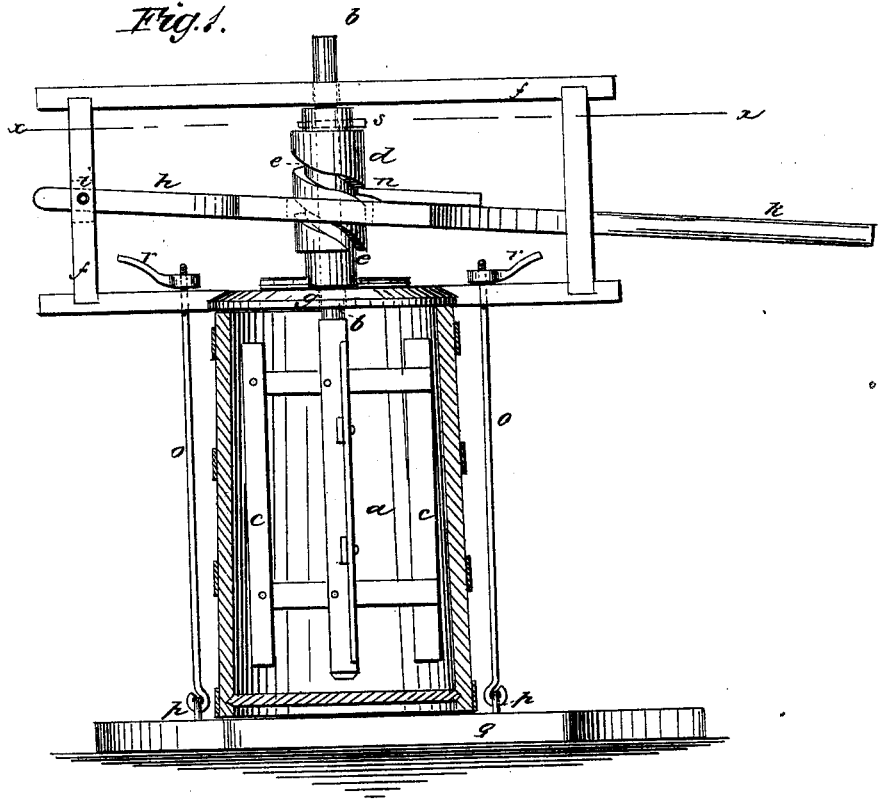
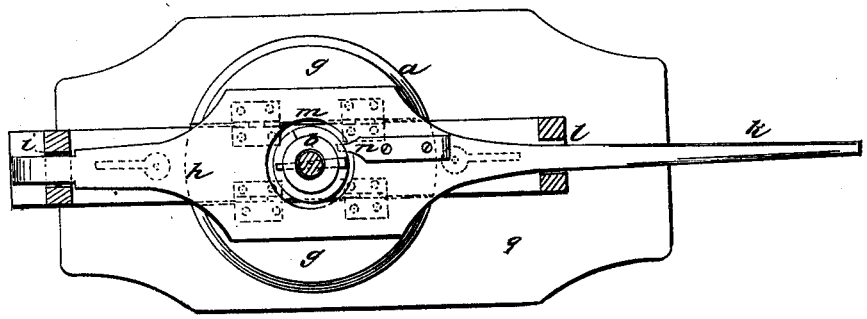
WITNESSES:
Francis McArdle.
C. Sedgwick.
INVENTOR:
S. Mellon
BY Munn & Co
ATTORNEYS.

UNITED STATES PATENT OFFICE.

SAMUEL MELLON, OF CAMERON, WEST VIRGINIA.

IMPROVEMENT IN VIBRATING CHURNS.

Specification forming part of Letters Patent No. 208,751, dated October 8, 1878; application filed August 22, 1878.

*To all whom it may concern:*

Be it known that I, SAMUEL MELLON, of Cameron, in the county of Marshall and State of West Virginia, have invented a new and Improved Churn, of which the following is a specification:

The object of my invention is to furnish a mechanism by which a churn may be easily operated, and to construct the operative parts in such a manner that they may be readily attached to and taken off the churn.

The invention will first be described in connection with the drawings, and then pointed out in the claim.

In the accompanying drawings, Figure 1 is an elevation of my improved churn and its operating mechanism, the churn-body being in section. Fig. 2 is a sectional plan of the churn at the line $x\ x$.

Similar letters of reference indicate corresponding parts.

$a$ is the churn-body. $b$ is the vertical dasher-rod, having dashers $c$ connected to the same within the body $a$. The upper end of rod $b$ is provided with a hub, $d$, that is connected to $b$ by a pin, $s$, passing through a hole in hub $d$ and rod $b$. $e$ is a spiral groove cut in the surface of hub $d$. The rod is supported in an upright rectangular frame, $f$, which rests upon the top of the churn-body $a$, and is provided with hinged lids $g\ g$, that form the cover of the churn. The hub $d$ rests upon the bottom bar of frame $f$, so that the rod and dasher are held up thereby, and the upper end of rod $b$ is journaled in the top bar of frame $f$. $h$ is a horizontal lever, hung by a pin, $i$, at one end of frame $f$, and having its moving end formed as a handle, $k$, which handle passes through a slot, $l$, in the side of frame $f$. The lever $h$ is formed wide adjacent to the hub $d$, and is provided with a hole, $m$, through which the hub $d$ passes. This hole $m$ is somewhat larger than $d$. $n$ is a lug or projection from the lever $h$, entering the spiral groove $e$ of the hub.

The frame $f$ is held in position by rods $o$ at opposite sides of churn-body $a$, which rods are formed at one end as hooks that connect with staples $p$ in the platform $q$, on which the churn rests, and the upper ends of rods $o$ pass through the bottom bar of frame $f$, and have a screw-thread cut upon them for the thumb-screws $r$. The platform $q$ may be a floor or a separate platform.

To operate the churn, the handle $k$ is reciprocated up and down in the slot $l$, and the motion thus imparted to lever $h$ will, by the action of lug $n$ in the groove $e$, cause an intermittent revolution of the rod $b$ first in one direction and then the other.

The frame $f$, rod $b$, and other parts may readily be removed from the churn-body $a$ by taking off the thumb-screws $r$. It is evident that this construction permits the frame and dasher to be applied to any desired churn-body. The churn-body does not have to be made especially for the operating mechanism, and, as no step is required at the lower end of rod $b\ b$, an earthernware vessel may be used.

If desired, a fan may be secured in the upper end of rod $d$.

By removing the pin $s$ the frame $f$ and hub $d$ may be removed and the dasher remain in the churn.

Having thus described my invention, I claim as new and desire to secure by Letters Patent—

The lids $g$, hinged to the frame $f$, that supports the dasher-rod $b$ and its operating-lever, substantially as described.

SAMUEL MELLON.

Witnesses:
 F. M. REYNOLDS,
 ISAAC N. COLLINS.